Aug. 14, 1956 C. H. SNYDER 2,758,874
FLUID DISCHARGE NOZZLE

Filed Jan. 4, 1954 2 Sheets-Sheet 1

INVENTOR.
CLIFFORD H. SNYDER
BY
HIS ATTORNEY

Aug. 14, 1956
C. H. SNYDER
2,758,874
FLUID DISCHARGE NOZZLE
Filed Jan. 4, 1954
2 Sheets-Sheet 2
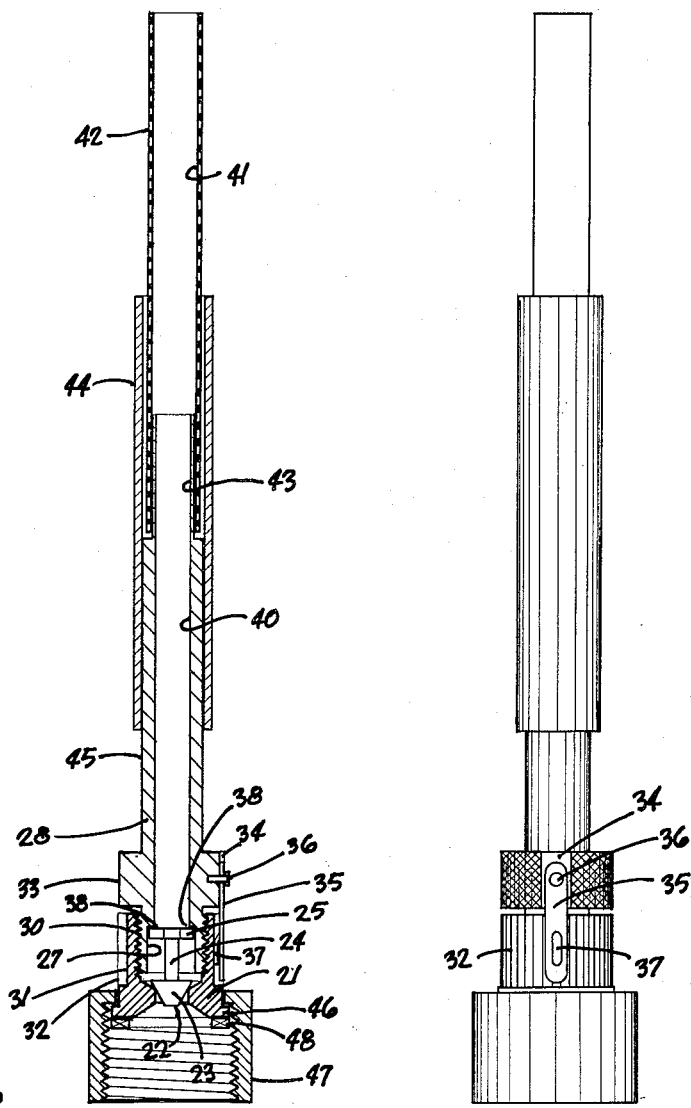
FIG. 6
FIG. 7
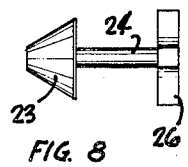
FIG. 8
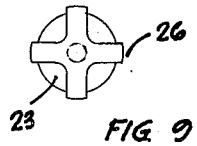
FIG. 9
INVENTOR.
CLIFFORD H. SNYDER
BY William D. Carothers
HIS ATTORNEY United States Patent Office 2,758,874
Patented Aug. 14, 1956

2,758,874

FLUID DISCHARGE NOZZLE

Clifford H. Snyder, Dormont, Pa., assignor to Nutritional Concentrates, Inc., New Lexington, Ohio, a corporation of Delaware Application January 4, 1954, Serial No. 401,843

7 Claims. (Cl. 299—65)

This invention relates generally to fluid discharge nozzles and more particularly to a controlled nozzle that distributes fluid under pressure over a wide area by the aid of the negative forces developed by the fluid being discharged.

The reactive forces of a fluid under pressure being discharged are quite evident from the whipping pressures of a fire hose or the rotary action of a lawn sprinkler. The reactive forces are effective back through the stream of fluid leaving the nozzle to the first turn in the stream providing a wall against which the reactive forces work. This reactive wall rapidly changes from one part of the hose to the other due to the whipping action of the flexible hose. Thus whipping distributes the stream of fluid through a wide sweep or area and distributes the fluid making it as effective as a spray. This is as effective with a gas as it is with a liquid.

By applying a sleeve slidable over the flexible hose one can restrict the whipping action and thus control the stream of fluid issuing therefrom. This sleeve may be rigid or even flexible. It is the effect that this sleeve has on the flexible hose that maintains the control. Thus if the hose is a soft rubber hose, then the sleeve could be a metallic section of a tube or pipe or a helically coiled spring or another larger flexible hose so long as this outer sleeve or tubular member can control or dampen the whipping action of the flexible hose discharging the fluid. It is preferable to slide the outer tube over the flexible inner hose to control its whipping action and change the stream from a wide whipping stream to a straight stream of fluid or to different whipping angles which may be almost as great as 180°. By controlling the pressure, the size of the bore of the hose, the length of the hose permitted to whip by the extent of the outer tube or sleeve, and the stiffness of the hose, one can make the discharge stream travel in an annular path that may appear to be elliptical in shape. These controls can be made to function on a stream discharged substantially horizontal as well as vertically up or down.

The control of the fluid discharged is accurate and can be immediately changed by regulating the telescoping action of the sleeve over the flexible discharge hose.

The effect of regulating the pressure as well as the volume of fluid released through the flexible hose also controls its flexible reaction. This may be controlled by use of a valve built into the nozzle.

Other objects and advantages appear hereinafter in the following specification and claims.

The accompanying drawings show for the purpose of exemplification without limiting the invention or claims thereto certain practical embodiments of the invention wherein:

Fig. 6 is a sectional view of a nozzle having a valve.

Fig. 7 is a view in side elevation of the structure shown in Fig. 6.

Fig. 8 is a view in side elevation of the valve.

Fig. 9 is an end view of the valve shown in Fig. 8.

Figure 1:
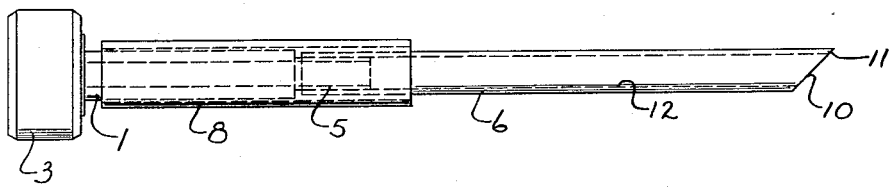
Fig. 1 is a side elevation of a nozzle comprising this invention.

Referring first to Fig. 1, the nozzle comprises the body member 1 which is provided with an annular flange member 2 having an internally threaded coupling member 3 rotatably mounted thereon and is ordinarily provided with a rubber washer 4 on the inner side thereof to seal the same when the threaded connection is secured to the end of the hose or other fluid conveying device.

The other end of the body 1 is provided with a stem 5 which is of a reduced diameter for the purpose of receiving a flexible hose member 6. The body member 1 and the stem member 5 are preferably provided with a bore of uniform diameter as indicated at 7.

The body member 1 has a sleeve member 8 slidable thereon. A friction member 9 may be mounted on the body adjacent the stem 5 for the purpose of providing a friction member to impede the movement of the sleeve axially of the body member. It will be noted that the bore of the sleeve 8 is actually larger in diameter than the external diameter of the flexible hose member 6.

Figure 3:
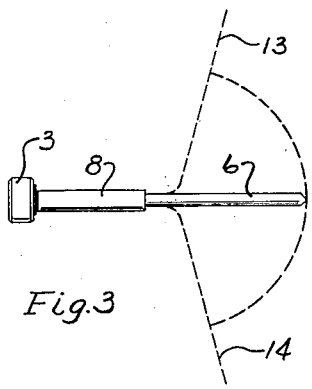
Fig. 3 is a small elevation illustrating the maximum flexibility of the discharge nozzle.

As shown in Fig. 1, the hose member 6 is clipped at an angle indicated at 10. This type of hose end increases the effective control of the whipping action of the hose as the longer side 11 of the inner bore 12 of the hose presents a reaction force upon the discharge of the fluid from the hose. When the sleeve 8 is withdrawn toward the coupling 3 as indicated in Fig. 1, the flexible hose 6 is free to whip and will whip as illustrated in Fig. 3 from the position as indicated between the dotted lines 13 and 14. When the sleeve 8 is slid away from the coupling 3 and over the flexible hose 6, it restricts the same as illustrated at 4 and the limit of the whipping action is then between the dotted lines 15 and 16 as shown in the drawing.

Figure 5:
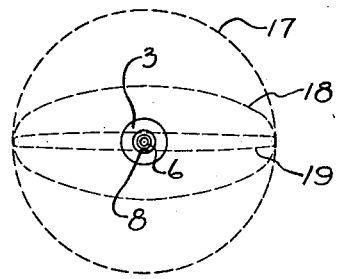
Fig. 5 shows a series of flow patterns created by different adjusted positions of the nozzle.
Figure 4:
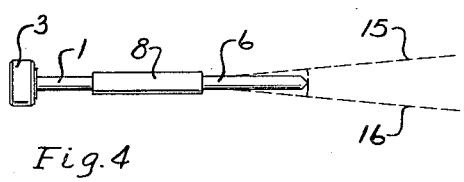
Fig. 4 is a view similar to Fig. 3 showing the whole of the sleeve in reducing the whipping action of the flexible nozzle.

By controlling the length and the relative position of the sleeve, the hose 6 may be made to travel in a circular path as indicated at 17 in Fig. 5 or it may be caused to oscillate in an elliptical path as indicated at 18 or a very narrow elliptical path as indicated at 19. Thus by closely adjusting the sleeve relative to the stem, different effects may be obtained in the operation of the nozzle.

Figure 2:
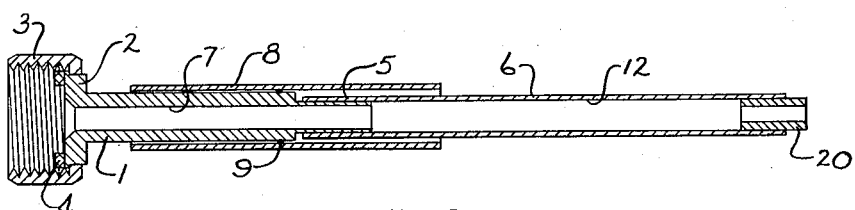
Fig. 2 is a sectional view of the nozzle comprising this invention, which is similar to Fig. 1 with the exception of the discharge tip.

As shown in Fig. 2 the end of the hose 6 is provided with a discharge sleeve 20, which being smaller in diameter and shorter than the flexible hose 6, is relatively stiff and also adds a weight at the end of the hose. The nozzle 20 may be constructed of a flexible material such as rubber, or it may be constructed of a solid material such as a metal, wood or plastic. If constructed of rubber, it can well be made of the same material from which the hose 6 is constructed, but which is preferably a very pure rubber which has the appearance of amber. However, the sleeve 20 being shorter and heavier in wall thickness than the tube 6 functions as a restrictive nozzle and provides a lower amplitude of whipping action and a slower rate of oscillation. The operation of a flexible nozzle with the tip 20 is substantially similar to that of the structure shown in Fig. 1 in so far as control is concerned, and in so far as the moving of the reaction surface due to the flexibility of the hose 6.

Referring specifically to the structures shown in Figs. 6 to 9, the body member 21 of the valve is provided with a valve orifice 22 in which is seated the valve member 23 having a stem 24 and a guide flange 25. It is preferable to construct this member as an integral piece, although it can be made in sections and put together. The guide flange 25 is made in the form of four fingers 26, the ends of which are slideable within the bore 27 of the tube 28. The exterior of the tube 28 is threaded as indicated at 30 to be received in the threaded socket 31 of the body member 21. The threaded socket 31 has a series of longitudinal grooves 32 around its perimeter. These grooves are parallel slots provided with a roughened surface with which to manipulate the body member 21.

The tube 28 is also provided with a manipulating flange 33 the surface of which is preferably knurled and which is provided with a longitudinally disposed slot 34 to receive the end of the spring member 35 which is secured thereto by means of the rivet 36. The spring 35 is substantially as wide as the slot 34 and thus is prevented from movement when held in place by the rivet 36. The outer or free end of the spring 35 is provided with a depression as indicated at 37 which fits in the slots or grooves 32 of the body member 21 and thus prevents unauthorized relative rotary movement between the tube 28 and the body member 21.

The bore 27 of the tube 28 is provided with ends at a shoulder 38 against which the arms 26 engage. Thus when the tube 28 is tightly screwed into the threaded socket 30, the valve member 23 engages the valve opening 22 to completely close the orifice. If however, the tube 28 is rotated by the flange 33 to back the shoulder 38 away from the seating position of the valve 23, the force of the water moves the valve from its seat allowing the water to pass through the orifice. As soon as the arms 26 of the valve member take the form of cross members, the fluid merely travels through the bore 27 past the arms 26. Of course the arms could be replaced by a nozzle disk with holes therein to perform the same function.

When the fluid is permitted to pass outwardly through the bore 40 of the tube 28 it flows into the bore 41 of the flexible hose 42 which in turn is fitted over the reduced end 43 of the tube 28. The flexible tube 42 will whip in the manner as previously described in relation to the foregoing structures and the control of its whip is maintained, but its slideable sleeve member 44 frictionally engages the outer surface 45 of the tube 28, and when it strikes the flange 33 the end of the sleeve is substantially even with the end of the reduced section 43 and the whole of the flexible portion of the hose 42 is free to swing through its greatest arc.

The body 21 is provided with the outwardly projecting flange 46 to receive the hose coupling member 47, and a washer 48 which seals the end of garden hose or other conduit.

Nozzles of this character may be employed in an overheated sprinkling system for use over long haul conveyors wherein the pipe carrying the liquid is extended longitudinally over the conveyor and is provided with spaced depending threaded outlets to which the nozzle as shown in Figs. 6 and 7 is attached. After the system is put in service the nozzle is adjusted to give the proper swing of the flexible hose and treat the material on the conveyor. If the material is coal, they ordinarily employ water to keep the dust down. If the material is a chemical, the nozzles may be employed to add a liquid chemical or a gaseous chemical for the treatment of the same as it travels along a conveyor. In any event the spring member 35 retains the adjusted position of the valve regardless of the vibration or the action of the valve. Thus by combining the operation of the sleeve and the valve, accurate adjustment in the distribution of the fluid being discharged from the hose can be controlled.

I claim:

1. A fluid discharge nozzle comprising a body having a connection for receiving fluid under pressure and having an outlet stem through which the fluid is discharged, a flexible hose of elastomer material on the end of said stem to receive and convey the fluid passing out of said stem, said flexible hose having sufficient flexibility and of sufficient length to cause it to whip due to the reaction forces of the fluid discharged from said hose, and a sleeve slidable on said stem with its outer end enclosing over said hose to vary the exposure of the free length thereof and control the whipping action of said hose.

2. The structure of claim 1 characterized in that the end of said hose has a restricting orifice comprising a smaller sleeve within the end of said hose.

3. The structure of claim 1 characterized in that said sleeve is constructed to provide a uniplanar whipping action at one position of said sleeve and an annular whipping action at another position of said sleeve.

4. The structure of claim 1 which also includes a valve member in said nozzle to control the flow of fluid passing therethrough thus functioning in combination with the sleeve to control the whipping action of said hose.

5. The structure of claim 1 characterized in that the inner diameter of said sleeve is greater than the outer diameter of said hose to provide clearance therebetween.

6. A fluid discharge nozzle comprising a body having a hollow connection for receiving fluid under pressure, a valve member in said body, a stem threadably secured to said body to adjust said valve member, an outlet in said stem for discharging fluid passing through the said body, a flexible hose of elastomer material on the end of said stem to convey and receive the material passing out of the stem and a sleeve slideable on said stem with its outer end enclosing over said hose to vary the exposure of the free length thereof.

7. The structure of claim 5 which also includes means to regulate the opening of said valve, and a lock to secure the controlled adjusted position of said valve.

References Cited in the file of this patent

UNITED STATES PATENTS

| 141,632 | Cooke | Aug. 12, 1873 |
| 913,791 | Wells | Mar. 2, 1909 |
| 1,079,574 | Nicholson | Nov. 29, 1913 |
| 1,706,070 | Methudy | Mar. 19, 1929 |
| 1,716,305 | Dillman | June 4, 1929 |
| 1,799,815 | Hoff | Apr. 7, 1931 |
| 1,862,957 | Grant | June 14, 1932 |
| 2,620,231 | King | Dec. 2, 1952 |

FOREIGN PATENTS

| 358,356 | Great Britain | Oct. 8, 1931 |